United States Patent
Del Popolo et al.

(10) Patent No.: US 12,473,147 B2
(45) Date of Patent: Nov. 18, 2025

(54) DEVICE FOR PICKING AND/OR DEPOSITING ITEMS FOR AUTOMATED WAREHOUSES

(71) Applicant: AUTOMHA S.P.A., Azzano San Paolo (IT)

(72) Inventors: Paolo Del Popolo, Azzano San Paolo (IT); Enrico Comotti, Azzano San Paolo (IT)

(73) Assignee: AUTOMHA S.P.A., Azzano San Paolo (Bergamo) (IT)

( * ) Notice: Subject to any disclaimer, the term of this patent is extended or adjusted under 35 U.S.C. 154(b) by 602 days.

(21) Appl. No.: 17/910,383

(22) PCT Filed: Mar. 17, 2021

(86) PCT No.: PCT/IB2021/052221
§ 371 (c)(1),
(2) Date: Sep. 9, 2022

(87) PCT Pub. No.: WO2021/186358
PCT Pub. Date: Sep. 23, 2021

(65) Prior Publication Data
US 2023/0140603 A1    May 4, 2023

(30) Foreign Application Priority Data
Mar. 17, 2020    (IT) .................. 102020000005632

(51) Int. Cl.
B65G 1/04    (2006.01)
(52) U.S. Cl.
CPC .......... B65G 1/0492 (2013.01); B65G 1/0435 (2013.01)
(58) Field of Classification Search
CPC .................. B65G 1/0435; B65G 1/0492
See application file for complete search history.

(56) References Cited

U.S. PATENT DOCUMENTS 8,596,952 B2 *  12/2013  Wolkerstorfer ...... B65G 1/0435
                                                  414/280
9,522,781 B2 *  12/2016  Hortig .................... B65G 1/065
(Continued)

FOREIGN PATENT DOCUMENTS

CN        109573449 A     4/2019
DE     102013100048 A1    5/2014
(Continued)

OTHER PUBLICATIONS

International Search Report, issued in PCT/IB2021/052221, mailed Jul. 16, 20201, Rijswijk, NL.
(Continued)

*Primary Examiner* — Timothy R Waggoner
(74) *Attorney, Agent, or Firm* — ArentFox Schiff LLP; Michael Fainberg

(57) ABSTRACT

A device for picking or depositing an item from or into a compartment of an automated warehouse has first moving means for moving the device along a main direction and primary electrical power supply means having a pair of forks moved by second moving means along a transverse direction between a retracted position and an extended position. Each fork has an end section having at least one thrust element movable between an operating position and an idle position. The end section has third moving means for moving the at least one thrust element. A central control unit commands moving parts of the device. The end section has a peripheral control unit for the third moving means. The end section has rechargeable secondary electrical power supply means for supplying power to the peripheral control unit and to the third moving means.

21 Claims, 14 Drawing Sheets

(56) References Cited

U.S. PATENT DOCUMENTS

| | | | |
|---|---|---|---|
| 9,598,236 B2* | 3/2017 | Nakamura | B65G 1/0421 |
| 2005/0047895 A1 | 3/2005 | Lert, Jr. | |
| 2006/0245862 A1* | 11/2006 | Hansl | B65G 1/0435 |
| | | | 414/281 |
| 2011/0008138 A1* | 1/2011 | Yamashita | B65G 1/0435 |
| | | | 414/277 |
| 2015/0081089 A1* | 3/2015 | Kapust | B65G 1/0492 |
| | | | 700/218 |
| 2017/0313514 A1* | 11/2017 | Lert, Jr. | B65G 1/0478 |
| 2017/0341862 A1* | 11/2017 | Aschauer | B65G 1/0435 |

FOREIGN PATENT DOCUMENTS

| | | | |
|---|---|---|---|
| WO | 2012083055 A1 | 6/2012 | |
| WO | 2015038999 A2 | 3/2015 | |
| WO | 2016196815 A1 | 12/2016 | |

OTHER PUBLICATIONS

Automha SpA, Promo Video 3D: Peakmover Plus, YouTube, Nov. 20, 2019, p. 1, retrived from the Internet (Jun. 30, 2021) URL: https://www.youtube.com/watch?v=xcu2re0-JZ8.

* cited by examiner

DEVICE FOR PICKING AND/OR DEPOSITING ITEMS FOR AUTOMATED WAREHOUSES

CROSS-REFERENCE TO RELATED APPLICATIONS

This application is a National Phase Application of PCT International Application No. PCT/IB2021/052221, having an International Filing Date of Mar. 17, 2021 which claims priority to Italian Application No. 102020000005632 filed Mar. 17, 2020, each of which is hereby incorporated by reference in its entirety.

FIELD OF THE INVENTION

The present invention relates to the field of realizing automated systems for storing items, or automated warehousing, preferably of boxed items.

In particular, the invention relates to a device for picking or depositing an item, preferably a boxed item, from or into a location in a warehouse in an automated storage system of items.

BACKGROUND ART

The use of automated devices capable of moving items between different points/locations of the system is known in the field of storage systems for items.

Typically, the systems constitute of a storage area strictly speaking, or warehouse, comprising multiple positioning compartments of the items, e.g., defined by shelves arranged side-by-side and/or superimposed, one or more feeding areas of the warehouse, in which the items to be stored are positioned, and one or more outfeed areas of the items picked from the warehouse.

The movement between the various locations of the system is carried out, according to the background art, by appropriate autonomous devices for picking and/or depositing said items.

The devices of the known type are appropriately shaped to pick/unload the item from a compartment/shelf and transport it to a picking point and, vice versa, to take it from a picking point to the compartment/shelf into which the item is loaded.

The devices of known type have an area for temporarily laying the item during its movement, e.g., a platform.

The device moves along main and preferential directions between the warehouse aisles. Preferably, the storage compartments/shelves are arranged on the sides of the aisle, on the right and/or on the left relative to the main direction of advancement of the device.

The device moves along the aisles by means of wheels moved by one or more electric motors powered by supercapacitors and batteries (e.g., lithium) positioned aboard the device itself. Alternatively, a motor power supply system can be provided by means of power bars placed on the floor of the aisle. A brush in contact with the power bar transfers the electrical energy to power the electrical parts aboard the device.

Indeed, in addition to the movement along the aisles, the device is also equipped with two forks that can be moved along a direction perpendicular to said main direction. The two forks have a telescopic configuration formed by sections, also named stages, which allow both the extension of the forks to enter a warehouse location and their subsequent retraction for extracting them, during the loading or unloading of the item into or from the warehouse.

The last stage of each fork is provided with movable elements, also named fingers, positionable in a retracted neutral position and in a protruding operating position relative to the fork, the function of which is to feed/push the box from the compartment to the device platform or, vice versa, to push the box from the device platform to the storage compartment. Appropriate motors fitted aboard the forks allow the movement of the fingers between the neutral and operating position and vice versa.

However, the loading/unloading devices of known type have some drawbacks.

A first drawback of such systems is in the need to reach the motors fitted aboard the forks, which allow the movement of the fingers, by means of wiring of multiple cables for powering and/or controlling the forks, typically by means of cable chains. The result is a high level of construction complexity, which has a negative impact both during the construction of the device and in possible later maintenance and/or replacement operations.

Furthermore, the presence of cables and cable chains increases the overall dimensions of the moving parts and generally implies larger dimensions, to the detriment of the compactness of the device.

Furthermore, since the forks are continuously moved back and forth telescopically during operation, the aforesaid cables are also subject to continuous movement. This adversely affects the system reliability, in terms of possible wear of the moving parts, possible wear of the cables and/or possible detachment between the interconnecting areas of the cables, e.g., of the electrical connection terminals.

An example of a device of the background art is described in WO2015/038999 A2. However, such a device inconveniently only allows its forks to be extended at the same time and only on one side for moving the boxes and thus does not allow the boxes to be moved symmetrically on two opposite warehouse aisles. Furthermore, the space to accommodate the boxes is inconveniently cluttered by the motor and motor control electronics.

SUMMARY OF THE INVENTION

It is an object of the present invention to overcome the drawbacks of the prior art at least in part.

In particular, it is an object of the present invention to suggest a loading/unloading device for automatic warehouses, which makes it possible to reduce the construction complexity relative to devices of known type.

It is an object of the present invention to suggest a loading/unloading device for automatic warehouses, which makes it possible to reduce the assembly times and/or costs relative to devices of known type.

It is a further object of the present invention to suggest a loading/unloading device for automatic warehouses, which makes it possible to increase the reliability relative to devices of known type.

SUMMARY

In a first aspect thereof, the present invention thus relates to a device for picking or depositing an item from or into a compartment of an automated warehouse, said device comprising:

a supporting structure provided with first moving means suitable to move said device along a main direction within said warehouse;

a temporary resting zone for said item;

primary electrical power supply means for said device connected to said supporting structure;

a pair of forks facing each other comprising second moving means suitable to move said forks relative to said supporting structure in at least a transverse direction relative to said main direction between a retracted position at said temporary resting zone and an extended position in the direction of said compartment, each fork of said pair of forks comprising an end section provided with at least one thrust element positionable in at least one operating position, in which said thrust element can rest on said item and in at least one idle position in which said thrust element does not interfere with said item, said end section comprising third moving means for moving said at least one thrust element;

a central control unit integral with said supporting structure;

wherein said end section comprises a peripheral control unit for said third moving means, said peripheral control unit and said central control unit being configured for wireless communication with each other, and wherein said end section comprises rechargeable secondary electrical power supply means suitable to power to said peripheral control unit and said third moving means.

In a preferred embodiment, the rechargeable secondary electrical power supply means are suitable to be recharged with the energy provided by the primary electrical power supply means when the forks are positioned in a predetermined recharging position relative to the supporting structure.

According to a preferred embodiment of the invention, said predetermined recharging position corresponds to the retracted position of the forks.

Preferably, the rechargeable secondary electrical power supply means comprise at least one super-capacitor.

In a preferred embodiment, the device comprises electrical interconnection means between the secondary electrical power supply means and the primary electrical power supply means.

According to a preferred embodiment of the invention, the electrical interconnection means comprise sliding contacts.

Preferably, the transverse direction of movement of the forks is a direction perpendicular to the main direction of movement of the device.

In a preferred embodiment, the primary electrical power supply means comprise one or more super-capacitors and/or lithium batteries.

According to a preferred embodiment of the invention, the primary electrical power supply means comprise a system, which receives electrical energy by means of the sliding contact with one or more fixed electrical bars of said warehouse.

Preferably, the device further comprises adjustment means for adjusting the mutual distance between the pair of forks.

In a preferred embodiment, the operating position of the thrust element is a horizontal position and/or the idle position of the thrust element is a vertical position.

According to a preferred embodiment of the invention, the thrust element is positionable between the operating position and the idle position by rotation.

Preferably, the end section further comprises sensor means for detecting the position of the thrust element.

In a preferred embodiment, the central control unit comprises a second unit interposed between the central control unit and the peripheral control unit, said second unit being suitable to send command signals for operating said third moving means.

Preferably, the communication between said second unit and said central control unit is wired communication.

In a variant embodiment, the communication between said second unit and said central control unit is wireless communication.

In another aspect, the present invention relates to an automated storage system comprising a warehouse comprising one or more compartments for receiving an item to be stored and at least one device for picking or storing an item from or into one of said compartments, wherein the device is implemented as described above.

BRIEF DESCRIPTION OF THE DRAWINGS

To better understand the features and advantages of the invention, a non-limiting example of a practical embodiment is described below with reference to the accompanying drawings, in which.

DETAILED DESCRIPTION OF THE INVENTION

Figure 1:
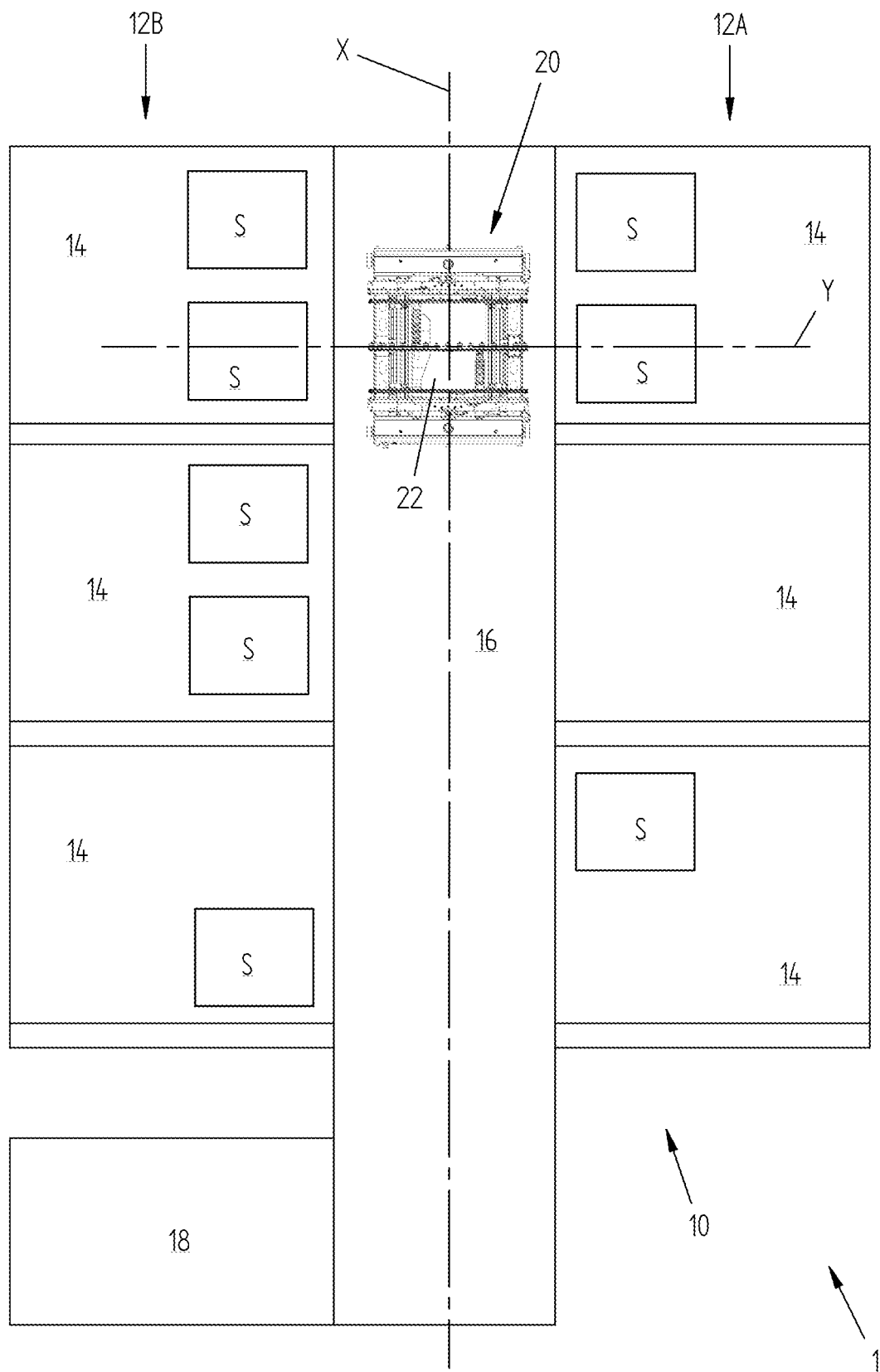
FIG. 1 shows a diagrammatic view of an automated warehouse and a picking or depositing device in a first operating position according to a preferred embodiment of the present invention.

Although the present invention is described below with reference to a detailed description of the embodiments shown in the drawings, the present invention is not limited to the embodiments described hereinafter and shown in the drawings. On the contrary, the embodiments described and represented clarify some aspects of the present invention.

The present invention has proved to be particularly advantageous with reference to the making of a picking or depositing device which moves in a warehouse in an autonomous and self-powered manner, as illustrated in greater detail below.

It is worth noting that the present invention is not limited to the making of autonomous and self-powered device. On the contrary, the present invention is conveniently applied to all cases which envisage the use of a device, which moves in an appropriately powered warehouse, e.g., a power supply system on fixed guides on which the device rests.

FIG. 1 diagrammatically shows an automatic storage system 1 for items S comprising a warehouse 10 and a picking or depositing device 20 according to a preferred embodiment of the invention.

The warehouse 10 illustrated in the figures by way of example has a simple layout and preferably comprises two rows 12A, 12B of three compartments 14 arranged laterally relative to a central aisle 16, i.e., a first row 12A of three compartments 14 arranged to the right of the central aisle 16 and a second row 12B of three compartments 14 arranged to the left of the central aisle 16.

The warehouse 10 further preferably comprises a loading/unloading location 18 of the items S, i.e., an area on which an item S to be stored in a predetermined compartment 14 of the warehouse 10 is placed or an area on which an item S to be picked from a compartment 14 of the warehouse 10 is placed.

An item S is advantageously moved in the system 1 by the picking or depositing device 20 according to the invention, henceforth referred to as device 20 for the sake of simplicity of presentation.

Preferably, the moving of the item S in the system 1 comprises moving the item S from the loading/unloading location 18 to a compartment 14 or, vice versa, from a compartment 14 to the loading/unloading location 18. In variant embodiments, the movement can also provide displacing an item S between two compartments 14 of the warehouse 10, either within the same first row 12A, or second row 12B, or from the first row 12A to the second row 12B and vice versa.

The device 20 according to the invention preferably allows the moving of box-shaped items S (i.e., preferably boxed items S, as shown in a simplified manner in FIG. 1).

Figure 3:
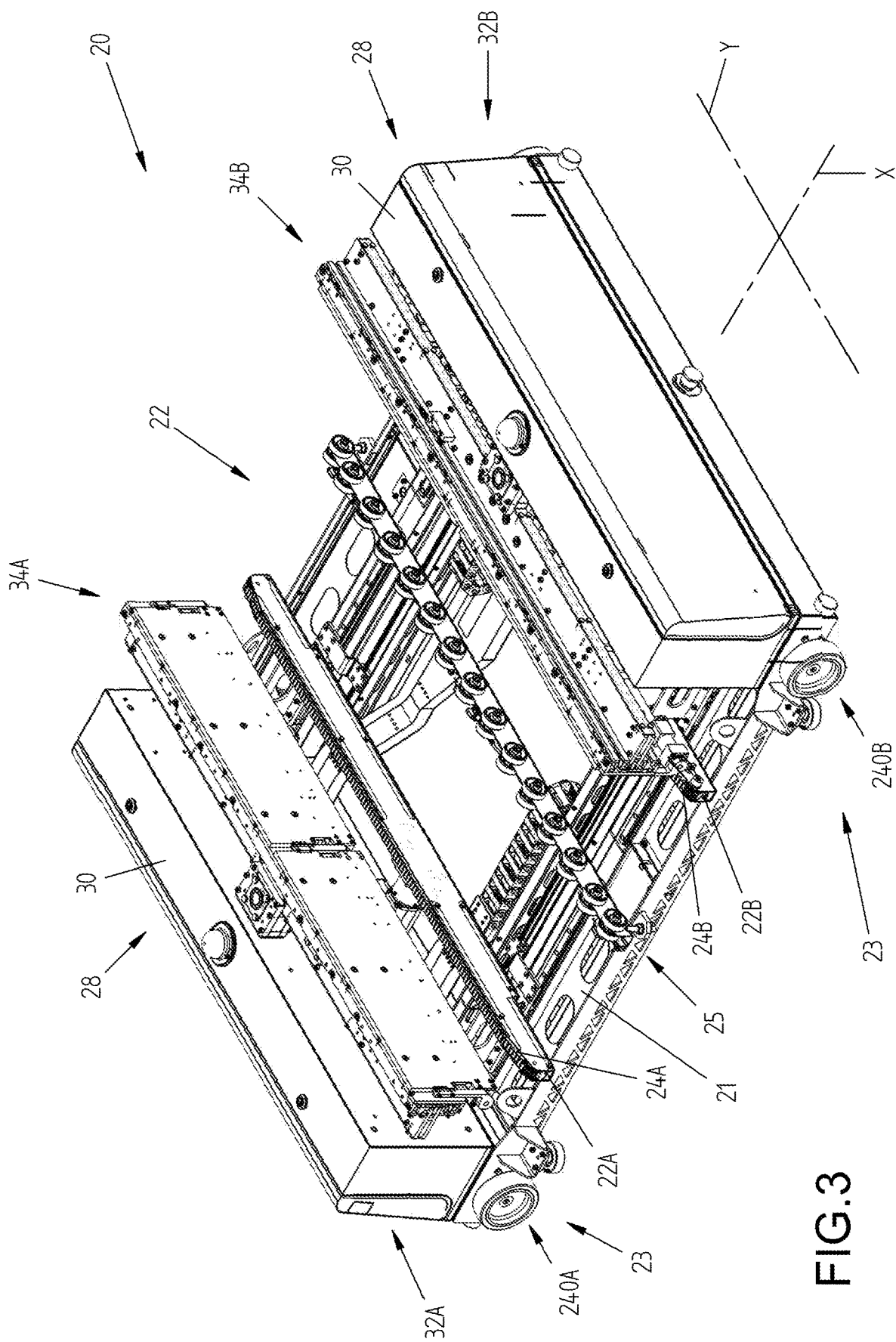
FIG. 3 shows an axonometric view of the device in FIG. 1 in a first operating position.

The device 20 comprises a supporting structure 21, or frame, on which a resting zone 22 is defined for temporarily resting the item S during its movement, e.g., as shown in FIG. 3. In the illustrated embodiment, the resting zone 22 comprises a pair of supporting bars 22A, 22B. Preferably, respective feeding belts 24A, 24B are wound on the supporting bars 22A, 22B to promote the positioning of the item S on the device 20, as illustrated in greater detail below. A central row of rolling rollers 25 is also present on the resting zone 22.

Figure 6:
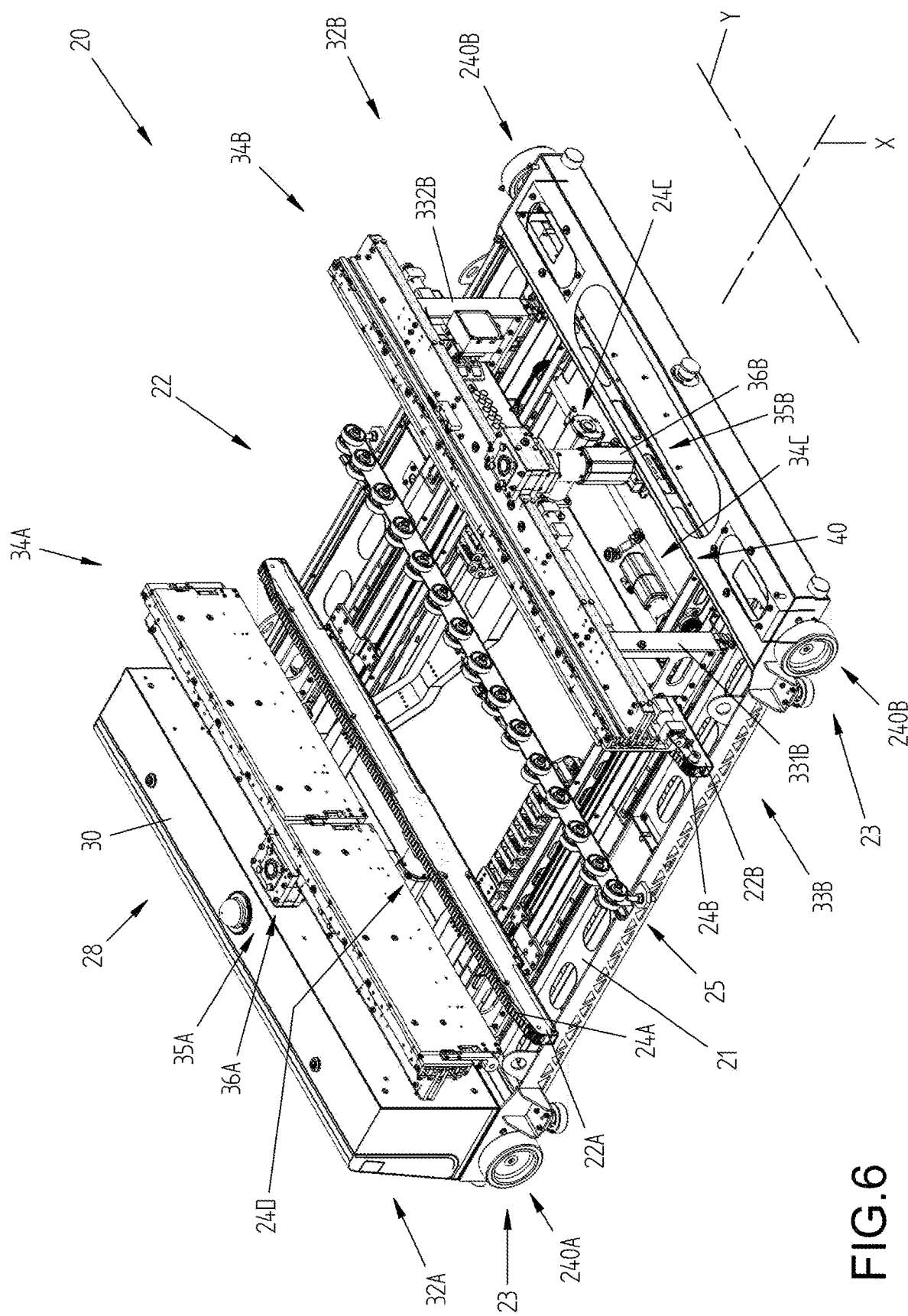
FIG. 6 shows the device in FIG. 3 with some elements removed.

The feeding belts 24A, 24B are preferably moved by motorized means 24C and 24D, shown in FIG. 6, preferably comprising an electric motor, more preferably of the brushless type.

The device 20 is firstly provided with first moving means 23 suitable to move the device 20 along the aisle 16 in a main direction X.

Preferably, the first moving means 23 comprise wheels 240A, 240B driven by one or more electric motors 26, in case in point two electric motors 26 associated with two of the wheels 240A, or drive wheels 240A (as shown in FIG. 6).

In a preferred embodiment, the device 20 comprises main electrical power supply means 28, or primary electrical power supply means, fitted aboard the device 20 to make the device 20 autonomous and self-powered.

In a preferred embodiment, the main electrical power supply means 28 comprise super-capacitors and/or batteries 30, e.g., lithium batteries, positioned in the headers 32A, 32B of the device 20 and connected to the frame 21.

In an alternative implementation solution, a power supply system of the motors can be provided by means of power bars placed on the floor along the aisle and a brush aboard the device which, placed in continuous contact with the power bar, transfers the electrical power supply for the parts aboard the device.

A central control unit 80 is integrally associated with the frame 21 of the device 20. The central unit 80 controls all moving parts of the device 20. Preferably, the central unit 80 communicates with a system management unit U, as diagrammatically shown in FIGS. 13 and 14, on which a warehouse software manages the operation of the system 1 and in particular the movements of the device 20 in the warehouse 10. The communication between the central unit 80 and the system management unit U is preferably wireless communication.

The central unit 80 is powered by said main electrical power supply means 28 and is preferably positioned in the first header 32A of the device 20.

Furthermore, the device 20 preferably comprises two forks 34A, 34B suitable to move along a second direction Y. The second direction Y is preferably transverse to said main direction X, more preferably perpendicular to said main direction X.

The two forks 34A, 34B face each other, preferably parallel, to define a predetermined mutual distance. Preferably, the device 20 is provided with adjustment means 40 (FIG. 6) for the distance between the two forks 34A, 34B, or pitch, which advantageously adjusts the distance of the forks 34A, 34B as a function of the size of the box S to be handled, e.g., the adjustment in a range between 300 and 800 mm. In the device as shown in FIG. 6, the pitch is adjusted by toothed belts (not shown), preferably driven by an electric motor (preferably, but not exclusively, of the brushless type) 34C, which feed the forks 34A, 34B as needed.

Preferably, the two forks 34A, 34B have a telescopic configuration formed by three sections 341A, 342A, 343A, 341B, 342B, 343B, referred to below as stages, which move telescopically along the second direction Y (see FIG. 8). A different number of stages, or even just one, can be provided in variants.

Figure 2:
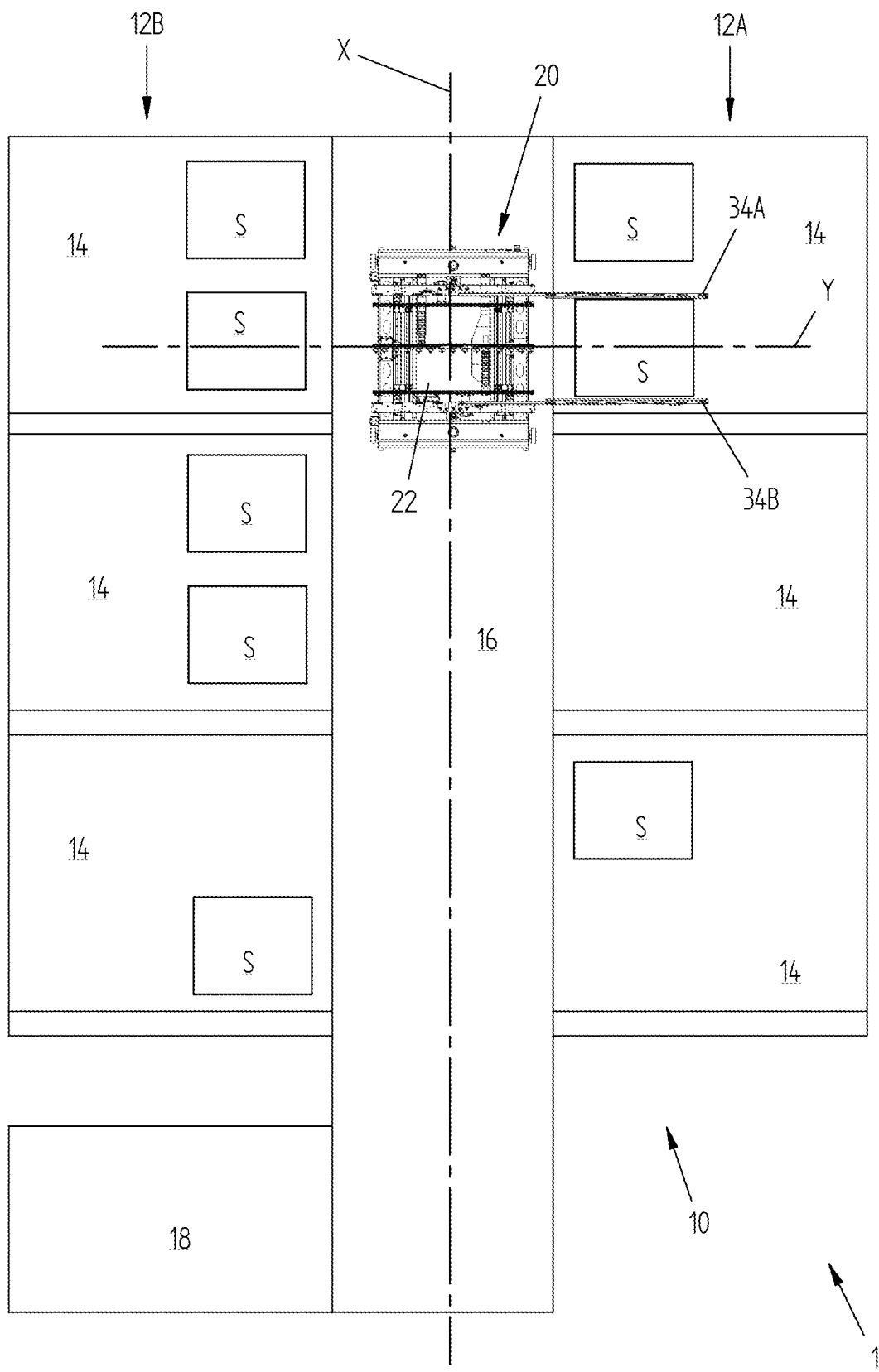
FIG. 2 shows the automatic warehouse in FIG. 1, in which the picking or depositing device is in an operating position.

The forks 34A, 34B are movable/extendable along the second direction Y to be inserted inside a compartment 14 of the warehouse 10, e.g., as shown in FIG. 2.

Secondary moving means 35A, 35B (see FIG. 6) allow the moving of forks 34A, 34B along the second direction Y. Preferably, the second moving means 35A, 35B comprise motors 36A, 36B (see FIG. 6) associated with a pinion-rack mechanism. Equivalent moving means can be provided as a variant, e.g., a belt system, chain system, etc.

As unequivocally shown in the accompanying FIGS. 3, 6, 10, and 11, according to an advantageous embodiment, a first motor 36A of such motors 36A, 36B is operatively connected to one (the left fork 34A) of the two forks 34A, 34B and a second separate motor 36B is operatively connected to the other (the right fork 34B) of the two forks 34A, 34B, so that the first motor 36A is suitable to move one of the two forks 34A, 34B independently of the other of the two forks 34A, 34B. In particular, the first motor 36A is suitable to move the left fork 34A and the second motor 36B is suitable to move the right fork 34B independently of the movement of the left fork 34A.

In a preferred embodiment, the two forks 34A, 34B are conformed to be able to be extended from both sides of the device 20, e.g., towards the right side or towards the left side with reference to FIGS. 1 and 2 to be able to reach all the compartments 14 to the right and to the left relative to the central aisle 16 of the warehouse 10. In other words, the two forks 34A, 34B are both extendable towards the right side of the device, facing the first row 12A, and towards the left side of the device facing the row 12B of the warehouse, thus along both directions of the second direction Y.

Therefore, in particular, the second moving means 35A, 35B allow moving the forks 34A, 34B in both directions along the second direction Y.

In a preferred embodiment, the magnitude of the movements and/or the magnitude of the extensions of the forks 34A, 34B along the second direction Y is managed by means of the encoder measuring the rotation of the motor 36A, 36B. For example, the entity of the displacement is related to the motor rotation 36A, 36B with a fixed value (mm per motor revolution).

Figure 4:
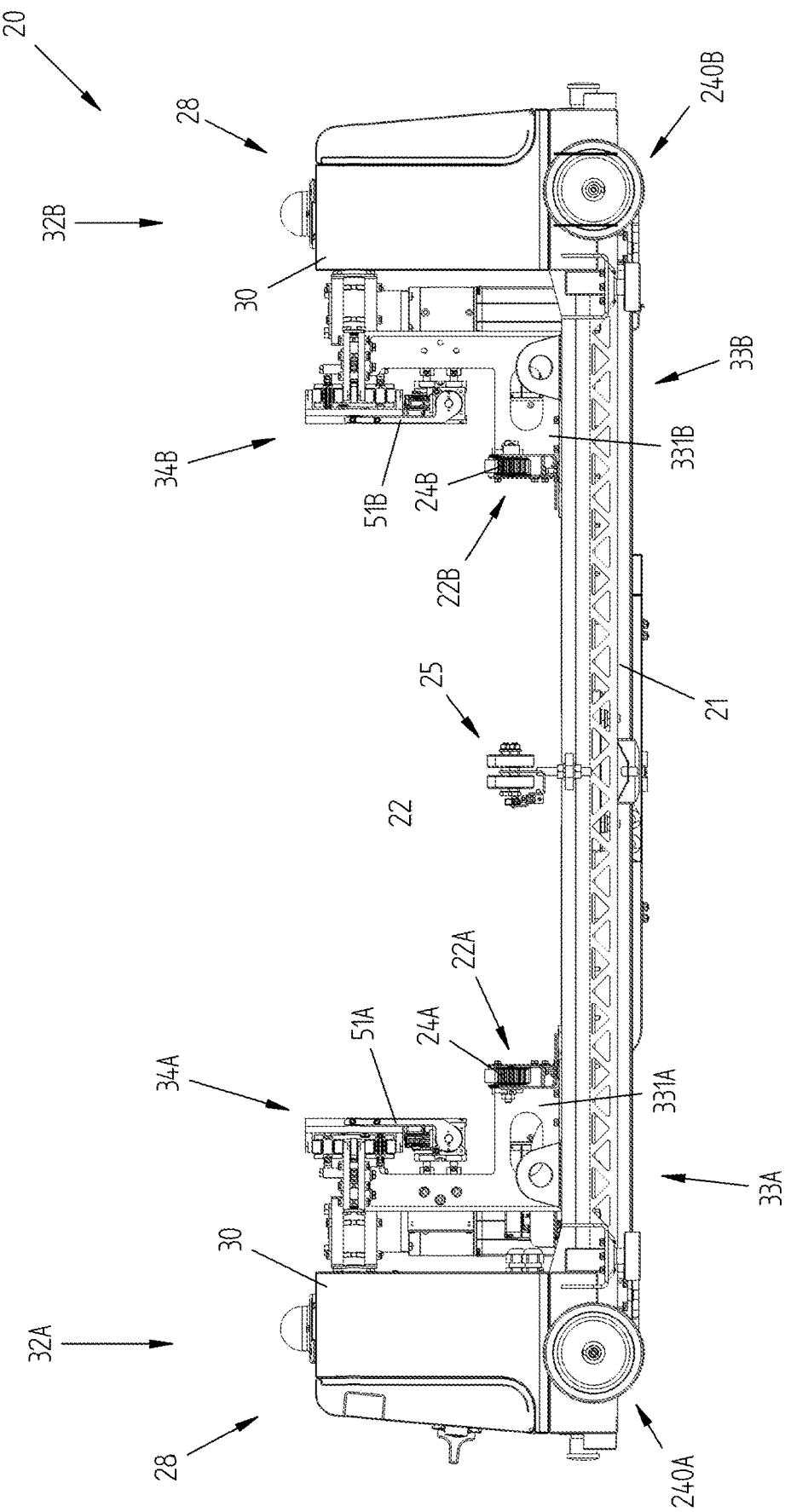
FIG. 4 shows a side plan view of the device in FIG. 3.
Figure 5:
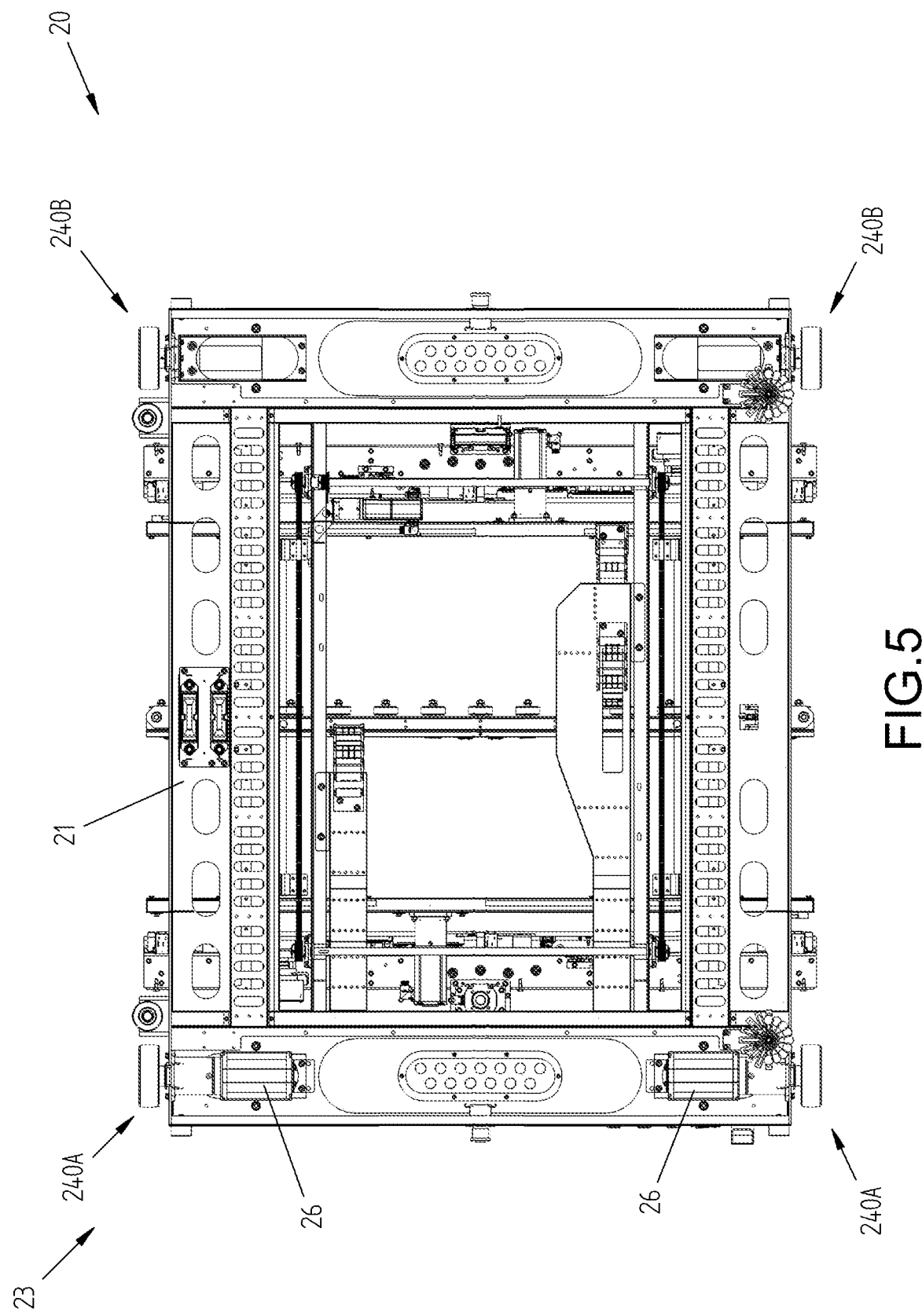
FIG. 5 shows a plan view from the bottom of the device in FIG. 3.

The forks 34A, 34B are connected to the frame 21 by means of a supporting structure 33A, 33B (see FIG. 4) preferably comprising a pair of uprights 331A, 332A, 331B, 332B (shown in FIG. 4, but partially shown in FIGS. 3, 4, 6, 7, 8, 11 and 12). It is worth noting that some reference numerals shown within the present description are not shown in the figures because the respective elements are not clearly visible. However, the position and construction of such non-visible elements can be easily inferred because they refer to elements of one fork that can be easily associated with the corresponding visible elements of the other fork, the two forks being made specularly with the same type of elements.

Figure 8:
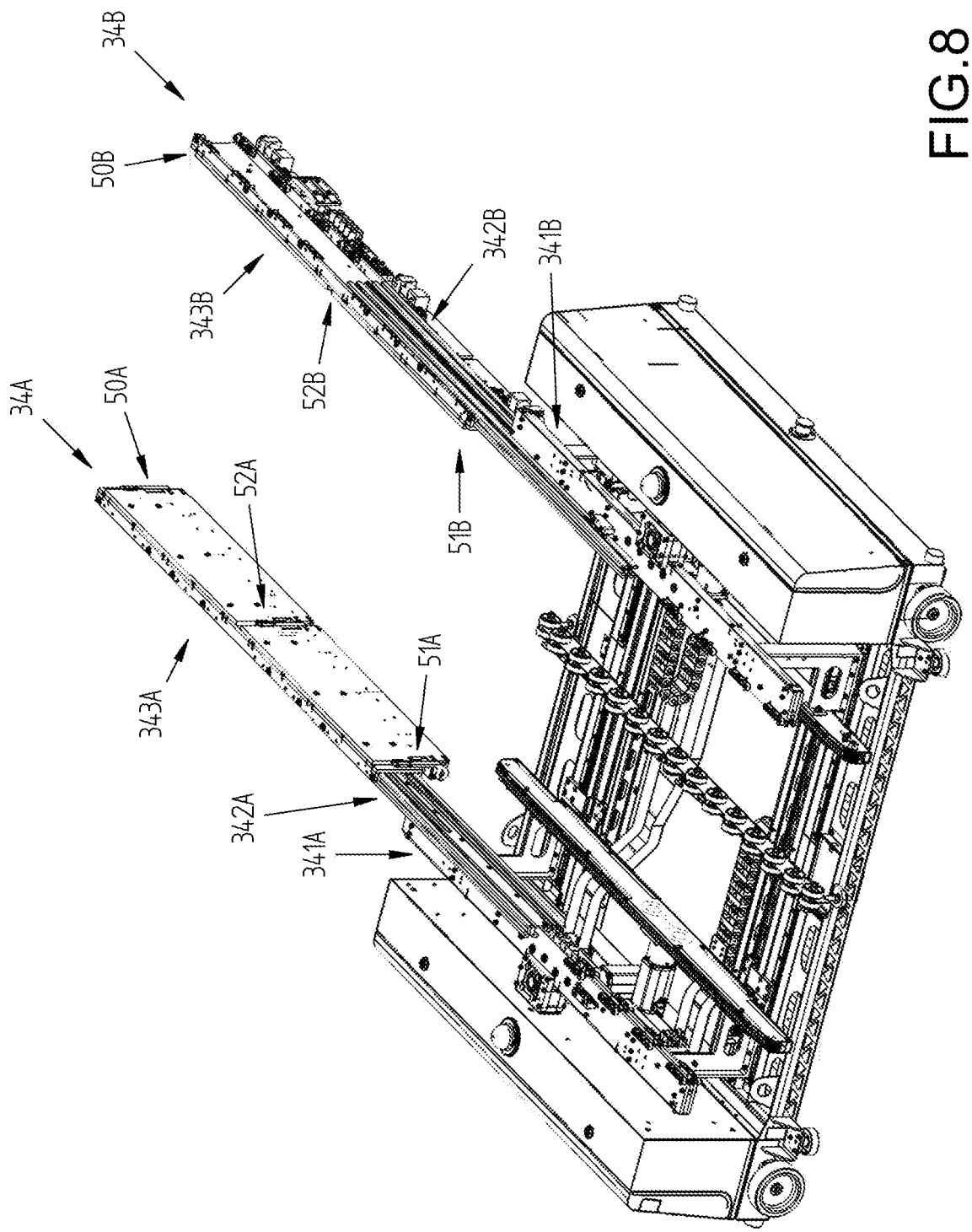
FIG. 8 shows an axonometric view of the device in FIG. 3 in a second operating position.
Figure 9:
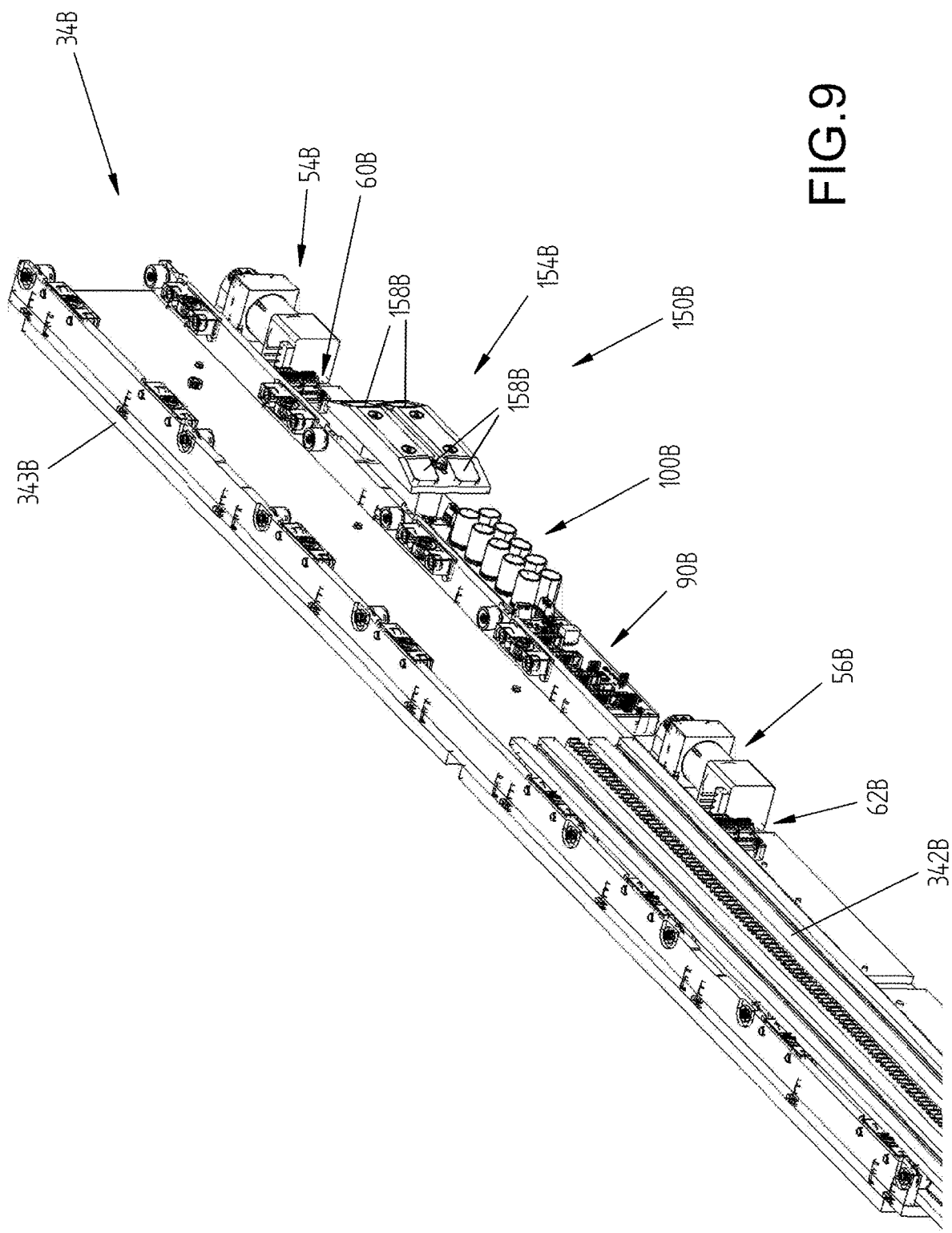
FIG. 9 shows a magnified detail of FIG. 8.

The last stage 343A, 343B of the two forks 34A, 34B, seen in greater detail in FIGS. 8 and 9, is preferably planar or plate-shaped, positioned vertically to be placed laterally relative to the item S, more preferably laterally with respect to the vertical walls of the box S, in the case of items packaged in a box S.

The last stage 343A, 343B constituting each of the forks 34A, 34B is provided with at least one thrust element 50A, 51A, 52A, 50B, 51B, 52B, also named finger (see in particular FIGS. 8 and 10), the function of which is to push/pull the box S from the compartment 14 of the warehouse 10 to the temporary resting zone 22 of the device 20 or to push the box S from the temporary resting zone 22 of the device 20 to the compartment 14 of the warehouse 10 (it is worth noting that some of said fingers are not completely visible in the figures).

Figure 10:
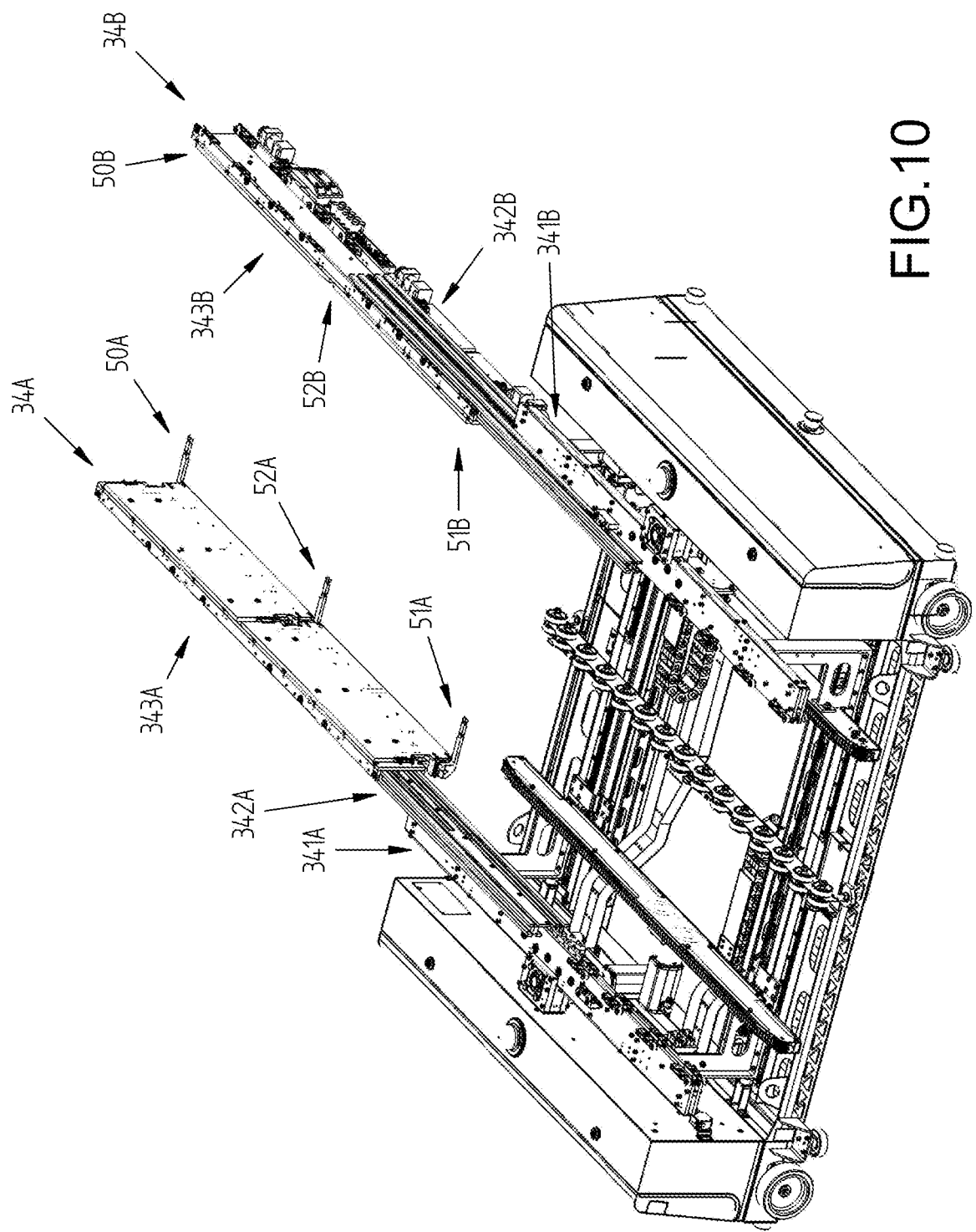
FIG. 10 shows the device in FIG. 8 with the thrust elements lowered.
Figure 11:
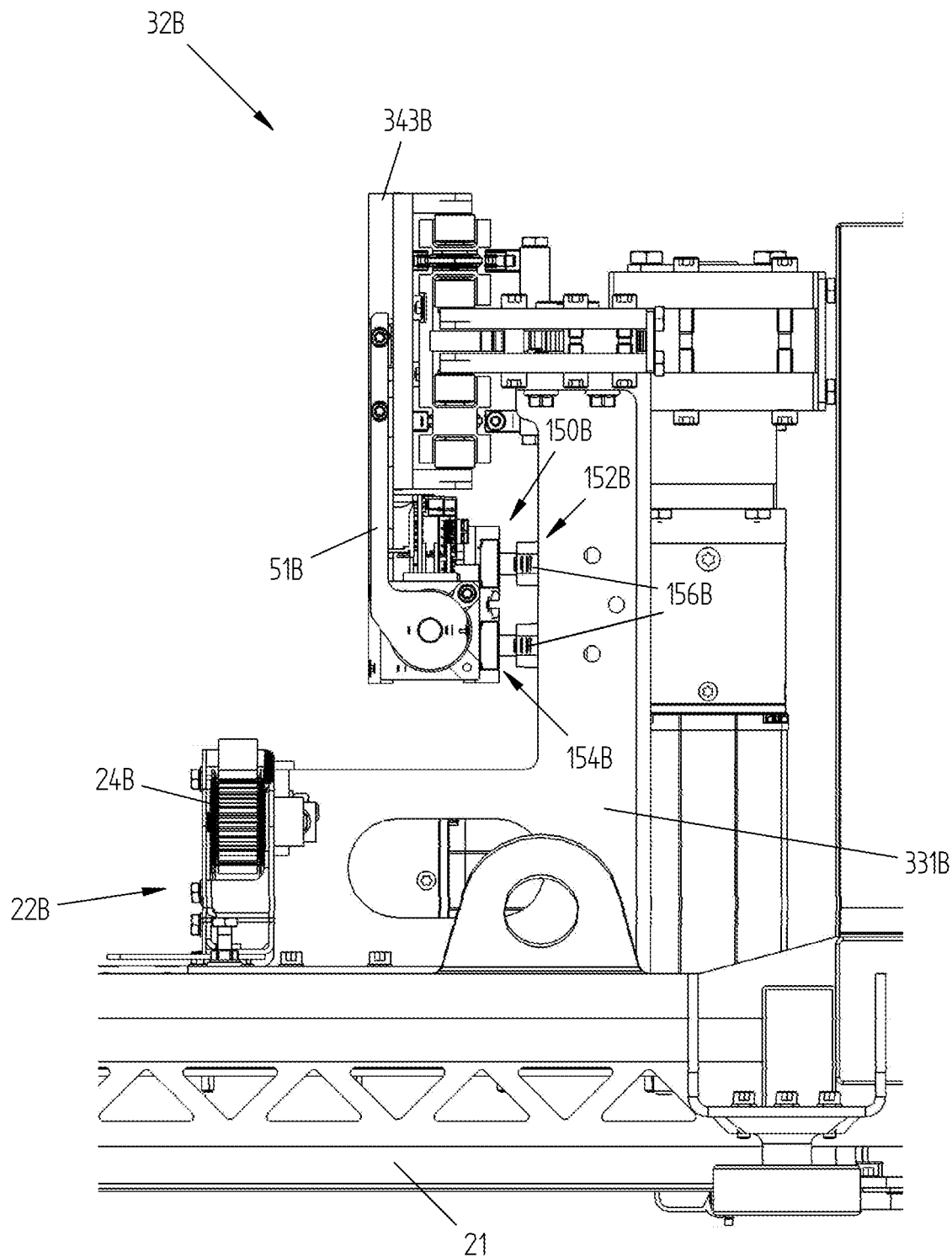
FIG. 11 shows a magnified detail of FIG. 4.
Figure 12:
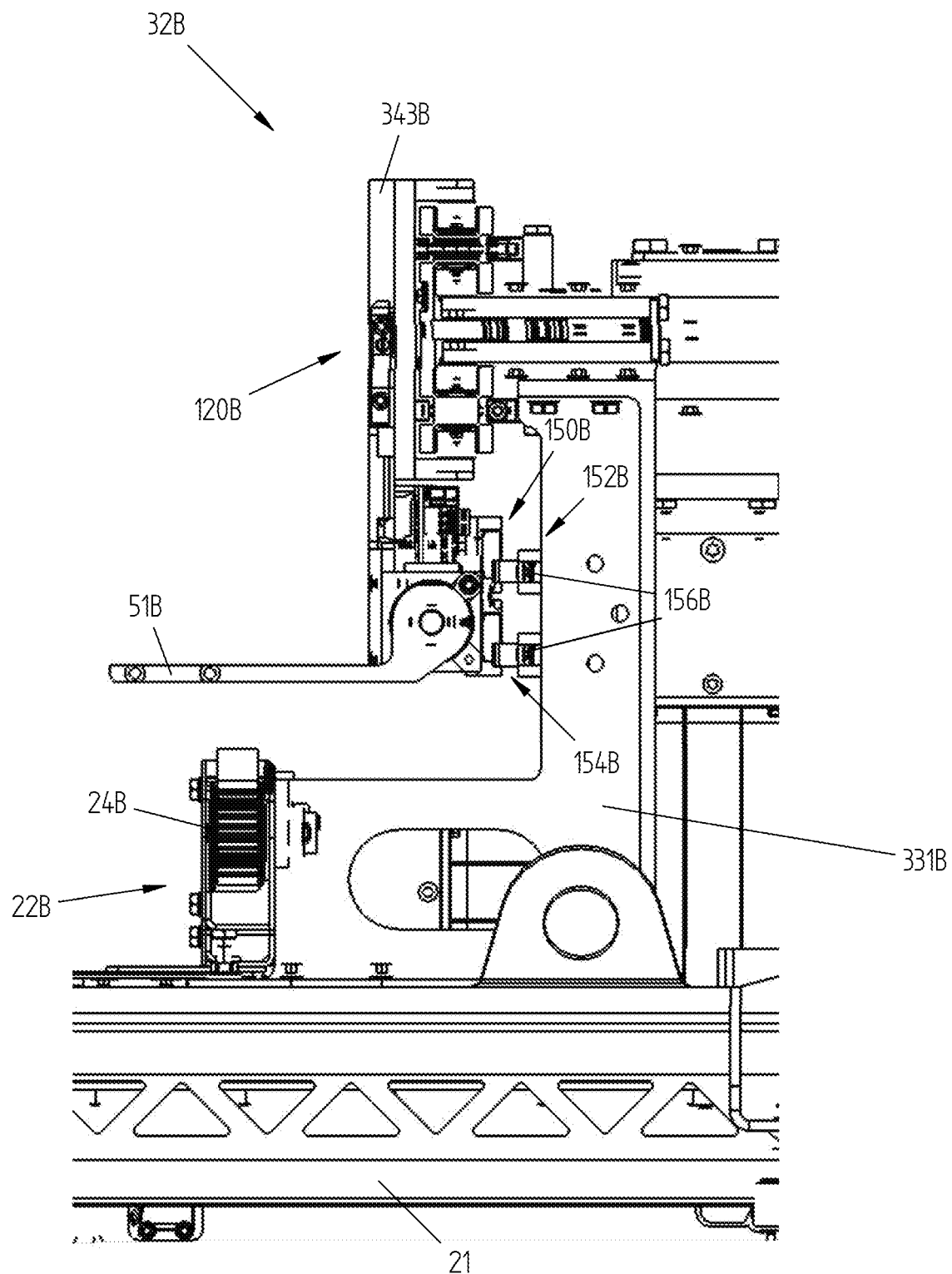
FIG. 12 shows the enlarged detail of FIG. 11 with the gripping element lowered.

Each finger 50A, 51A, 52A, 50B, 51B, 52B is positionable in a retracted, preferably vertical, idle position, e.g., as shown in FIGS. 3, 6, 8, and 11, and in a lowered, preferably horizontal, operating position, as shown for example in FIGS. 10 and 12.

Each of the fingers 50A, 51A, 52A, 50B, 51B, 52B is associated with third moving means for allowing rotation of the finger 50A, 51A, 52A, 50B, 51B, 52B between its idle and operating positions. The third moving means comprise motor means 54A, 55A, 56A, 54B, 55B, 56B, comprising electric motors (preferably brushless type), e.g., shown in FIGS. 7 and 9.

According to the preferred illustrated embodiment, the positioning between the idle and operating positions of each finger occurs preferably by rotation. Equivalent embodiments can be provided as variants, e.g., by means of elements associated with the last stage which protrude telescopically from the last stage.

According to the preferred embodiment shown in the figures, each end stage 343A, 343B comprises three fingers 50A, 51A, 52A, 50B, 51B, 52B.

Preferably, the first pair of facing fingers 50A, 50B in their lowered operating position allows the feeding of the box S from a compartment 14 on the right of the warehouse 10 to the temporary resting zone 22 of the device 20 or allows the thrust of the box from the temporary resting zone 22 of the device 20 to a compartment 14 on the left of the warehouse 10; the second pair of facing fingers 51A, 51B in their lowered operating position allows the feeding of the box S from a compartment 14 on the left of the warehouse 10 to the temporary resting zone 22 of the device 20 or allows the thrust of the box from the temporary resting zone 22 of the device 20 to a compartment 14 on the right of the warehouse 10; the third pair of facing fingers 52A, 52B is optionally present and depends on how the warehouse 10 is made, i.e. if there is a box S or there are two boxes positionable at different depths in the compartments 14.

The essential steps of picking of a box S from the warehouse 10 provide:
moving the device 20 along the main direction X until it reaches the position at the compartment 14 of the warehouse 10 where the box S to be picked is stored:
extending the forks 34A, 34B along the second direction Y by a length sufficient to cover the box S;
lowering the first pair of fingers 50A, 50B;
retracting the forks 34A, 34B while the fingers 50A, 50B feed/push the box S towards the temporary resting zone 22.

Preferably, during the last step, the feeding of the box S towards the temporary resting zone 22 is promoted by the actuation of the underlying feeding belts 24A, 24B, and the resting on the rolling rollers 25.

Similarly, the essential steps of loading of a box S from the warehouse 10 provide:
moving the device 20 with the box S aboard along the main direction X until it reaches the position at the compartment 14 of the warehouse 10 in which the box S must be stored:
lowering the second pair of fingers 51A, 51B;
extending the forks 34A, 34B along the second direction Y by a length sufficient to insert the box S into the compartment 14 while the fingers 51A, 51B push the box S;
retracting the forks 34A, 34B, and the fingers 51A, 51B.

The thrust step is preferably promoted by actuating the underlying feeding belts 24A, 24B, and by resting on the rolling rollers 25.

Figure 7:
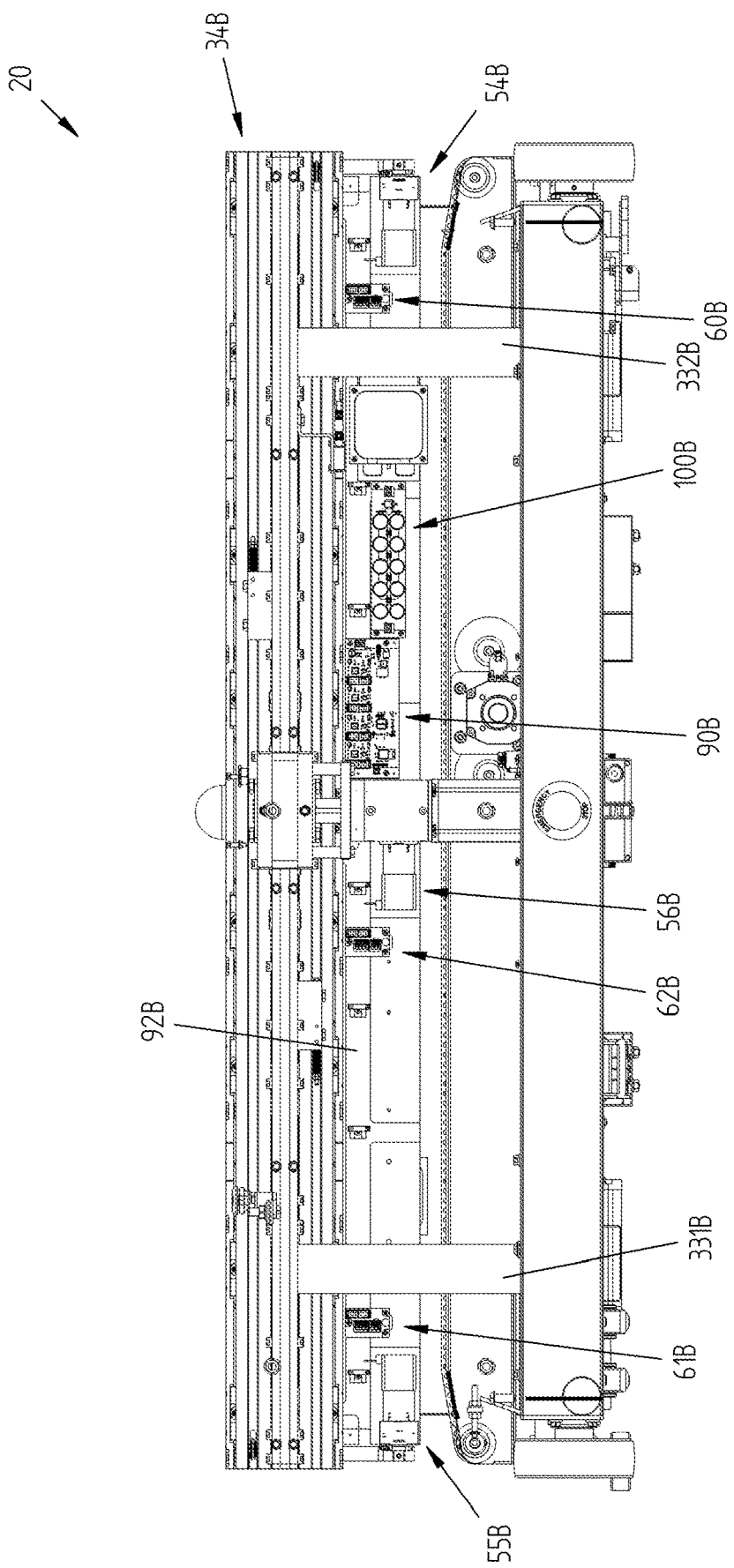
FIG. 7 shows a plan view from the right of the device in FIG. 6.

According to an aspect of the present invention, the last stage 343A, 343B of the fork 34A, 34B comprises a motor control unit 90A, 90B, or peripheral unit or slave unit, operatively connected to the motor means 54A, 55A, 56A, 54B, 55B, 56B of each finger 50A, 51A, 52A, 50B, 51B, 52B, as shown in FIG. 7 for the right-hand fork 34B only.

The slave unit 90A, 90B receives information from the central unit 80 for managing movement of the fingers 50A, 51A, 52A, 50B, 51B, 52B. The communication between the slave unit 90A, 90B, and the central unit 80 is advantageously a wireless communication.

Figure 13:
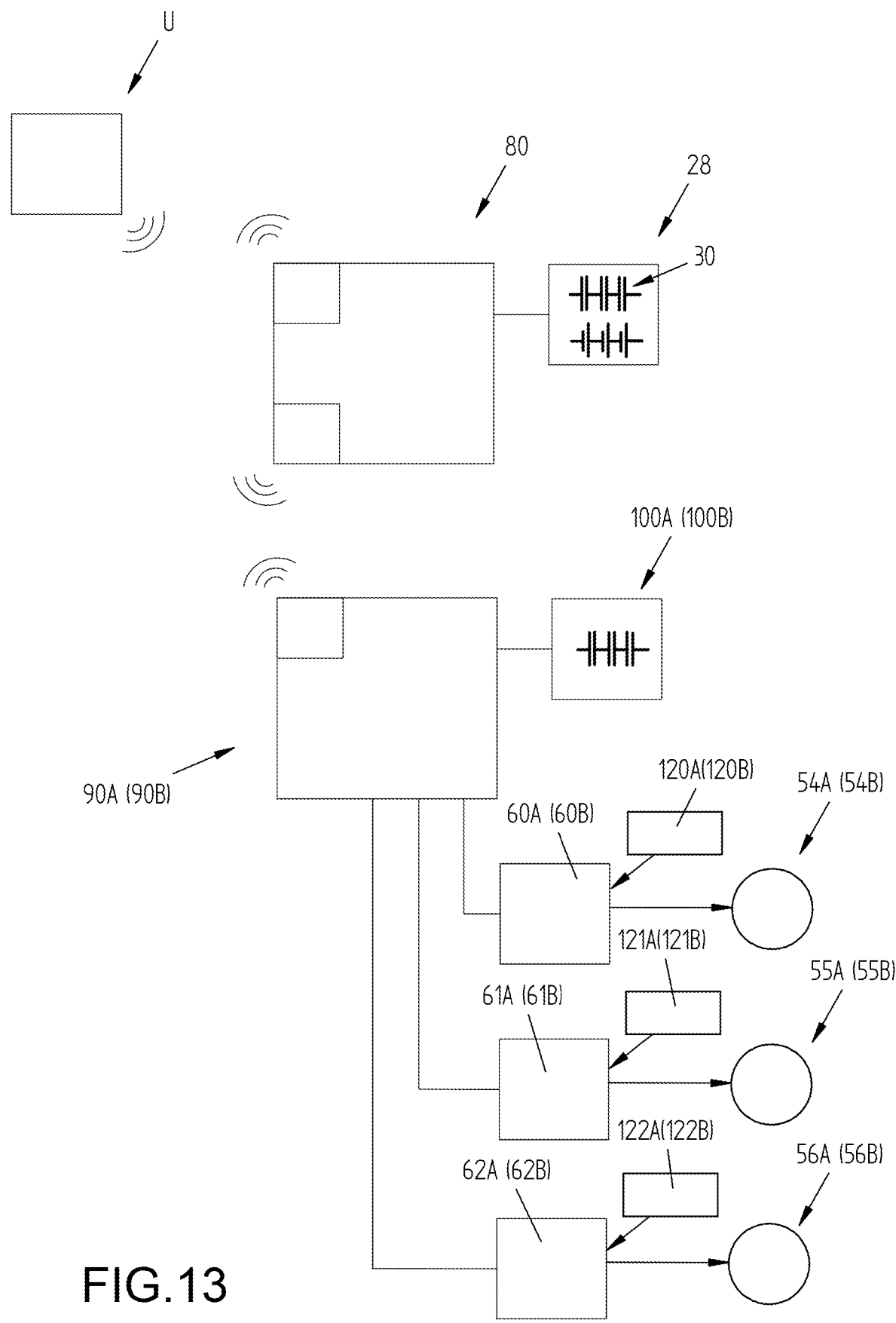
FIG. 13 shows a diagrammatic block view of the system in FIG. 1.

The slave unit 90A, 90B is preferably connected to the motor means 54A, 55A, 56A, 54B, 55B, 56B by means of respective motor boards 60A, 61A, 62A, 60B, 61B, 62B, as also diagrammatically shown in FIG. 13.

Each of the motor boards 60A, 61A, 62A, 60B, 61B, 62B is preferably connected to the corresponding motor 54A, 55A, 56A, 54B, 55B, 56B and to the slave unit 90A, 90B through a flat cable 92A, 92B, which runs longitudinally through the end stage 343A, 343B of the fork 34A, 34B; the slave unit 90A, 90B comprises at least "n" output ports, where "n" corresponds to the number of fingers 50A, 51A, 52A, 50B, 51B, 52B (three for the embodiment illustrated and described herein).

According to an embodiment, the movement of one or more motors 54A, 55A, 56A associated with the command of one or more thrust elements 50A, 51A, 52A of one 34A of the two forks is synchronized with the movement of one or more motors 54B, 55B, 56B associated with the command of one or more thrust elements 50B, 51B, 52B of the other 34B of the two forks.

In particular, the central control unit 80 is configured to send a first command signal to each slave unit 90A, 90B, containing a datum relative to the specific motor 54A, 55A, 56A, 54B, 55B, 56B to be commanded, and possibly to the position that the relative thrust element 50A, 51A, 52A, 50B, 51B, 52B must reach. Furthermore, the central control unit 80 is configured to send a second command signal containing the same datum as the first command signal to each slave unit 90A, 90B. The central control unit 80 is configured to send the first command signal wirelessly at a predetermined radio signal frequency (e.g., at a frequency suitable to a signal according to the Bluetooth standard, e.g., about 2.4 GHz). Furthermore, the central control unit 80 is configured to send the second command signal wirelessly at a second predetermined radio signal frequency that is lower than the predetermined radio signal frequency of the first signal, such as a radio communication frequency of less than 1 GHz, e.g., at a carrier frequency of 868 MHz (FSK) or 434 MHz.

Advantageously, the central unit 80 is configured to send the first command signal and the second command signal together within a predetermined time interval, e.g., within a time interval of about 100 milliseconds or about a few hundred milliseconds.

In particular, the central unit 80 is configured to send the first command signal and the second command signal together, within a predetermined time interval, e.g., within a predetermined time interval of about 100 milliseconds or about 2-3 hundred milliseconds.

Additionally, preferably, the central unit 80 is configured to send a plurality of first command signals equal to one another and spaced apart temporally by a first time interval shorter than the predetermined time interval. Furthermore, preferably together with said plurality of mutually equal first command signals, the central unit 80 is configured to send a plurality of second mutually equal command signals spaced apart temporally by a second time interval shorter than the predetermined time interval and greater than the first predetermined time interval.

This allows the same motor activation command to be sent in a redundant manner and on two separate wireless communication channels, minimizing the risk of losing communication.

Additionally, this ensures the synchronization between the thrust elements. Indeed, it is substantially ensured that the command is transmitted within the predetermined time interval (in the worst case) and any interference issues are also minimized.

In particular, according to an embodiment, the central control unit 80 comprises two radio modules at different frequencies, and also each slave unit (90A and 90B) comprises two radio modules at different frequencies.

Preferably, a first radio module of said two radio modules is a Bluetooth BLE v5 2.4 GHz communication module.

Preferably, the second radio module of said two radio modules is an FSK modulation module with frequency 868 MHz (or in any case a SUB-GHz radio module, i.e., with a carrier less than 1 GHz).

Preferably, communications between central unit 80 and slave boards are always transmitted and received in parallel on the two radio modules.

In particular, for performing a movement, the central control unit 80 communicates simultaneously with the slave units (90A and 90B). In addition to the machine information, the transmitted command signals (first command signal and second command signal) preferably contain synchronization and anti-overlapping control information, such as one or more of the following: package number, command time for executing the command. In particular, the command time for executing the command is a predetermined time value within which the movement command must be executed. For example, the command time is a value of a counter, which is decremented (counted down) and at the end of which the command towards the motors is executed by each slave unit (90A, 90B). In this manner, it is ensured that all motors are activated simultaneously when the predetermined time value expires. In other words, synchrony between the motors is guaranteed.

For example, the first and second command signals are transmitted from the central unit 80 repeatedly throughout the predetermined time interval, e.g., for 100 or 200 milliseconds. Transmission occurs both in Bluetooth and with the SUB-GHz radio module, with the particularity that in Bluetooth transmission occurs more frequently (shorter time interval between command signals) and thus a greater quantity of commands is sent within the predetermined time interval, while in SUB-GHz transmission is less frequent and the number of command signals is thus lower within the predetermined time interval.

This allows for real-time synchronization of mechanical finger movements. With motion synchronization lags of a few milliseconds.

Furthermore, the 868 MHz communication continues to work should there be particular radio disturbances that obscure one of the two carriers, such as Bluetooth.

In the same manner, the central unit 80 receives from the slave boards the status and diagnostic information of the latter, e.g., the status of the motors (OK, fault, not connected, short-circuit or mechanical block of the motor) and information of motor driver overtemperatures.

Furthermore, the central unit 80 is always aware of the status and quality of wireless communication to and from the slave boards.

According to another aspect of the present invention, the last stage 343A, 343B of the fork 34A, 34B further comprises secondary electrical power supply means 100A, 100B (see FIGS. 7 and 9). The secondary electrical power supply means 100A, 100B preferably comprise super-capacitors (as shown in particular in FIG. 9).

The secondary electrical power supply means 100A, 100B power the slave unit 90A, 90B, the motor boards 60A, 61A, 62A, 60B, 61B, 62B and the motor means 54A, 55A, 56A, 54B, 55B, 56B.

Therefore, advantageously, the slave unit 90A, 90B, the motor boards 60A, 61A, 62A, 60B, 61B, 62B, and the motor means 54A, 55A, 56A, 54B, 55B, 56B are independently powered by the secondary electrical power supply means 100A, 100B. Furthermore, by virtue of the wireless communication between the slave unit 90A, 90B and the central unit 80, there is no need for cables and related wiring between the last movable stage 343A, 343B of the fork 34A, 34B, and the parts integral with the frame 21 of the device 20. The disadvantages associated with the use of cables of known types of systems are thus overcome.

In a further aspect of the present invention, a sensor 120A, 121A, 122A, 120B, 121B, 122B is positioned at each finger 50A, 51A, 52A, 50B, 51B, 52B (one of these sensors 120B being shown in FIG. 12), e.g., an optical and/or magnetic and/or mechanical detector, suitable to detect the position of the finger 50A, 51A, 52A, 50B, 51B, 52B, in particular its vertical retracted position.

The finger position 50A, 51A, 52A, 50B, 51B, 52B detected by the corresponding sensor 120A, 121A, 122A, 120B, 121B, 122B is communicated to the slave unit 90A, 90B.

In a preferred embodiment, the sensors 120A, 121A, 122A, 120B, 121B, 122B are connected to the slave unit 90A, 90B through cables.

In a preferred embodiment, the sensors 120A, 121A, 122A, 120B, 121B, 122B are connected to the slave unit 90A, 90B through wireless communication.

Preferably, all of the above-described elements are fitted on the outer side of the last movable stage 343A, 343B of the respective fork 34A, 34B. In particular, as clearly and unequivocally apparent to the person skilled in the art from the accompanying figures, the motor control unit 90A, 90B (or peripheral unit or slave unit) is fitted on the outer side of the last movable stage. Furthermore, the third moving means 54A, 55A, 56A, 54B, 55B, 56B are fitted on the outer side. In particular, the motor of each finger 50A, 51A, 52A, 50B, 51B, 52B, and the respective motor board 60A, 61A, 62A, 60B, 61B, 62B, are all located on the outer side of the last movable stage 343A, 343B. Additionally, the secondary electrical power supply means 100A, 100B are preferably located on the outer side of the last movable stage. Therefore, this applies to both forks 34A, 34B.

The arrangement on the outer side of one or more of the aforesaid components, as well as of all of them, makes it advantageously possible to avoid cluttering the inner space, i.e., the resting zone. Therefore, this ensures a suitable space for receiving the boxes in the resting zone 22, free from other devices. At the same time, this allows the forks 34A, 34B to be moved in both directions along the second direction Y, thereby enabling two rows 12A, 12B of the warehouse 10 to be served efficiently. Indeed, the presence of an element facing towards the inner side, i.e., towards the resting zone 22, would be an impediment during the step of translation of the forks in both sides along the second direction Y.

It is also apparent that an outer side of the last movable stage means an outer side of the last movable stage arranged on the side opposite to the resting zone 22 for temporarily resting the item S. In other words, each last movable stage 343A, 343B of the respective fork 34A, 34B comprises a fork inner side facing the resting zone 22, e.g., when the forks are in a retracted position, and an opposite fork outer side not facing the resting zone 22.

In the presented embodiment, the last movable stage 343A, 343B is planar or plate-shaped, preferably the inner fork side and the outer fork side are two opposing sides of the planar or plate-shaped part having greater surface extension.

In particular, each of said sensors 120A, 121A, 122A, 120B, 121B, 122B is installed near a corresponding finger 50A, 51A, 52A, 50B, 51B, 52B.

According to a further aspect of the present invention, the device 20 comprises electrical interconnection means 150A, 150B (see FIG. 12) between the primary electrical power supply means 28 and the secondary electrical power supply means 100A, 100B (see FIG. 7).

Preferably, the interconnecting means 150A, 150B allow the electrical connection between the main electrical power supply means 28 and the secondary electrical power supply means 100A, 100B when the fork 34A, 34B is in a predetermined position relative to the frame 21, or recharging position.

Preferably, the recharging position corresponds to the retracted position of the fork 34A, 34B, i.e., with the last movable stage 343A, 343B of the forks 34A, 34B at the resting zone 22.

In the recharging position, the secondary electrical power supply means 100A, 100B are subjected to recharging the energy from the primary electrical power supply means 28.

According to the illustrated preferred embodiment, the interconnection means 150A, 150B comprise two sliding contacts 152A, 154A, 152B, 154B (see FIGS. 11 and 12), a first contact 152A, 152B being associated with the frame 21, more preferably a first contact 152A, 152B associated with the supporting structure 33A, 33B of the fork 34A, 34B, and a second contact 154A, 154B associated with the last movable stage 343A, 343B of the fork 34A, 34B, as seen in greater detail in FIG. 8.

The first contact 152A, 152B preferably comprises elastic thrust means 156A, 156B (see FIGS. 11 and 12) suitable to generate a force towards the fork 34A, 34B to guarantee the electrical contact when it contacts the second contact 154A, 154B. Furthermore, the second contact 154A, 154B preferably comprises inclined surfaces 158A, 158B suitable to promote the interaction with corresponding inclined surfaces (not visible) present on the first contact.

Therefore, the secondary electrical power supply means 100A, 100B are advantageously recharged without needing cables, thus obtaining the above-mentioned advantages resulting from the elimination of the wiring provided in the known type systems.

Furthermore, the elimination of wiring simplifies device construction operations compared to known type devices with associated benefits in terms of assembly time and/or costs.

Again, advantageously, the reduction of wired parts makes it possible to increase the reliability against known type devices.

Furthermore, the removal of wired parts, together with the simultaneous possibility of providing a suitable space for accommodating the boxes, improves the box moving reliability and efficiency. Indeed, by virtue of the absence of other electronic devices on the forks that could clutter or hinder the resting zone, it is possible to avoid undesired collisions, but above all, it is possible to move the forks on both sides of the device to serve opposite rows of the warehouse.

Figure 14:
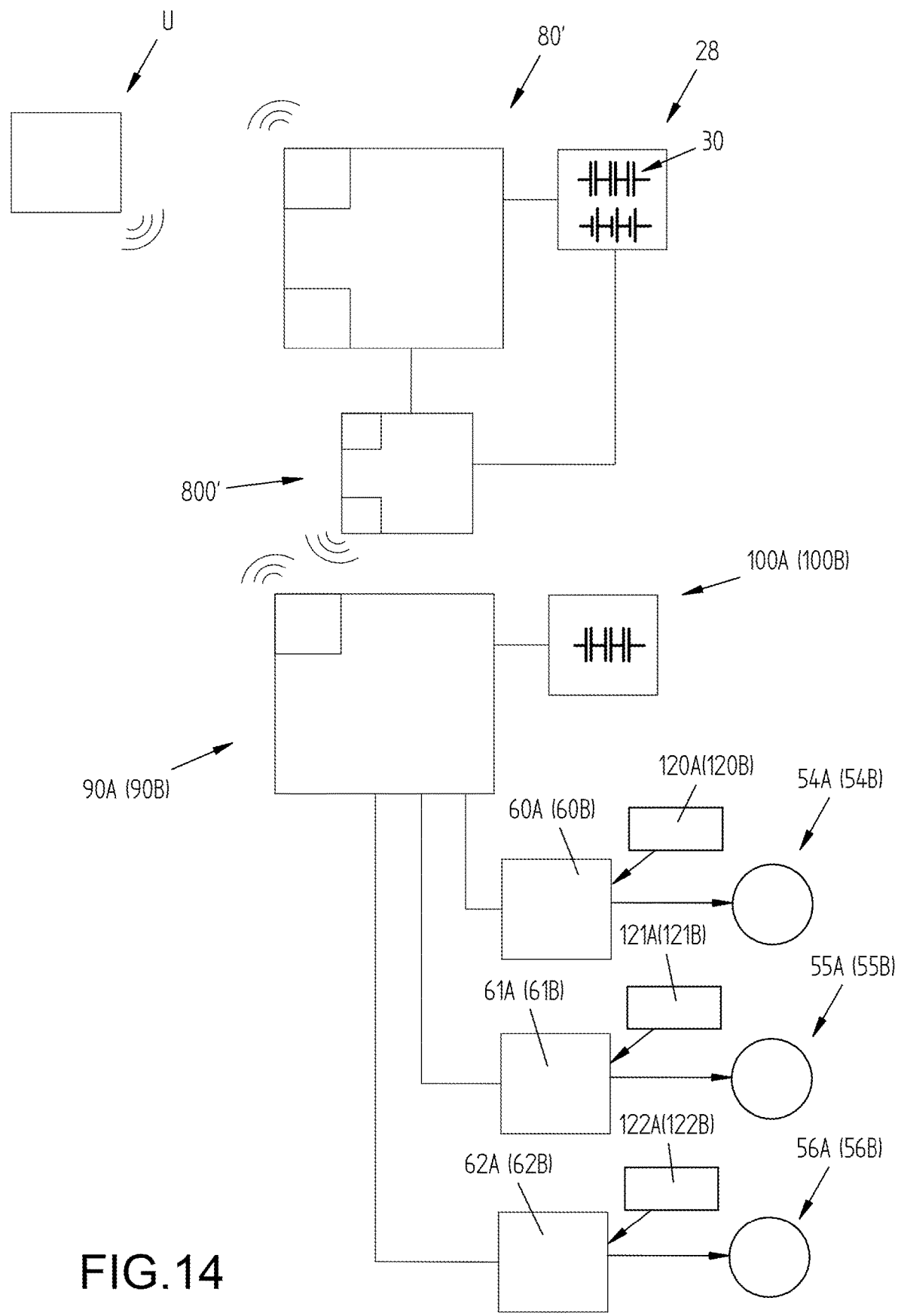
FIG. 14 shows a variant embodiment of the block chart in FIG. 13.

A block chart relating to an embodiment variant of the invention is shown with reference to FIG. 14, which differs from the prior embodiment in that the central control unit 80' further comprises a second unit 800', or master unit, which is interposed between the communication stream to or from the slave unit(s) 90A, 90B.

The function of the master unit 800' is to send command signals for operating the motor means 54A, 55A, 56A, 54B, 55B, 56B and to collect signals from the sensors 120A, 121A, 122A, 120B, 121B, 122B which control the position of the fingers 50A, 51A, 52A, 50B, 51B, 52B. The signals from the sensors 120A, 121A, 122A, 120B, 121B, 122B are detected by the slave units and then sent to the master unit 800' which sends the status of the sensors to the central unit 80'.

The communication between the master unit 800' and the slave unit(s) 90A, 90B is preferably a wireless communication.

The communication between the master unit 800' and the central control unit 80' is preferably wired.

In a variant embodiment, the communication between the master unit 800' and the central control unit 80' is preferably a wireless communication.

Finally, it is worth noting that the wireless type communications mentioned in this description are preferably compliant with the Bluetooth Low Energy or BLE 4.2 standard.

Therefore, this description has demonstrated that the device according to the present invention achieves the predetermined objects. In particular, the device according to the present invention makes it possible to reduce the construction complexity with respect to the devices of the known type.

Although the present invention is explained above by means of a detailed description of embodiments thereof shown in the drawings, the present invention is not obviously limited to the embodiments described above and shown on the drawings; on the contrary, further variants of the described embodiments fall within the object of the present invention as defined by the claims.

The invention claimed is:

1. A device for picking or depositing an item from or into a compartment of an automated warehouse, said device comprising:
   a supporting structure provided with first moving means for moving said device along a main direction (X) in said automated warehouse;
   a temporary resting zone for said item;
   primary electrical power supply means for said device connected to said supporting structure;
   a pair of forks facing each other comprising second moving means for moving said forks relative to said supporting structure in at least one transverse direction (Y) relative to said main direction (X) between a retracted position at said temporary resting zone and an extended position in direction of said compartment, each fork of said pair of forks comprising an end section provided with at least one thrust element positionable in at least one operating position, in which said at least one thrust element is suitable for resting on said item and is suitable for resting in at least one idle position in which said at least one thrust element does not interfere with said item, the end section of each fork of said pair of forks comprising third moving means for moving said at least one thrust element; and
   a central control unit integral with said supporting structure,
   wherein said end section comprises a peripheral control unit for said third moving means, said peripheral control unit and said central control unit being configured for a wireless communication with each other, wherein said end section further comprises rechargeable secondary electrical power supply means suitable to power said peripheral control unit and said third moving means,
   and wherein said peripheral control unit and said third moving means are mounted on an outer side of the end section of a respective fork of said pair of forks.

2. The device of claim 1, wherein said forks are shaped to be extended on both sides of the device to reach all compartments to the right and to the left, relative to a central aisle of the automated warehouse.

3. The device of claim 1, wherein said rechargeable secondary electrical power supply means are suitable to be recharged by energy provided by said primary electrical power supply means when said forks are positioned in a predetermined recharging position relative to said supporting structure.

4. The device of claim 3, wherein said predetermined recharging position corresponds to said retracted position of said forks.

5. The device of claim 1, wherein said rechargeable secondary electrical power supply means comprise at least one super-capacitor.

6. The device of claim 1, further comprising electrical interconnection means between said rechargeable secondary electrical power supply means and said primary electrical power supply means.

7. The device of claim 6, wherein said electrical interconnection means comprise sliding contacts.

8. The device of claim 1, c wherein said at least one transverse direction (Y) is a direction perpendicular to said main direction.

9. The device of claim 1, wherein said primary electrical power supply means comprise one or more super-capacitors and/or lithium batteries.

10. The device of claim 1, wherein said primary electrical power supply means comprise a system that receives electrical energy by sliding contact with one or more fixed electrical bars of said automated warehouse.

11. The device of claim 1, further comprising adjustment means for adjusting mutual distance between said pair of forks.

12. The device of claim 1, wherein said at least one operating position of said at least one thrust element is a horizontal position.

13. The device of claim 1, wherein said at least one thrust element is positionable between said at least one operating position and said at least one idle position by rotation.

14. The device of claim 1, wherein said end section further comprises sensors for detecting a position of said at least one thrust element.

15. The device of claim 1, wherein said central control unit comprises a master unit interposed between said central control unit and said peripheral control unit, said master unit being suitable to send command signals for operating said third moving means.

16. The device of claim 1, wherein a movement of one or more motors of said third moving means associated with a command of one or more thrust elements of one fork of the pair of forks is synchronized with a movement of one or more motors of the third moving means associated with the command of one or more thrust elements of the other fork of the pair of forks.

17. The device of claim 16, wherein the central control unit is configured to send a first command signal to each peripheral control unit, containing a datum related to a specific motor to be commanded,
   wherein the central control unit is configured to send a second command signal containing a same datum as the first command signal to each peripheral control unit,
   and wherein the central control unit is configured to wirelessly send the first command signal at a predetermined radio signal frequency and to wirelessly send the second command signal at a second predetermined radio signal frequency lower than the predetermined radio signal frequency of the first command signal.

18. An automated storage system comprising a warehouse comprising one or more compartments for receiving an item to be stored and at least one device for picking or depositing the item from or into one of said compartments, wherein said at least one device is the device of claim 1.

19. The device of claim 1, wherein said at least one idle position of said at least one thrust element is a vertical position.

20. The device of claim 18, wherein the second predetermined radio signal frequency is less than 1 GHz.

21. The device of claim 18, wherein the predetermined radio signal frequency has a frequency according to the Bluetooth standard.

* * * * *